W. S. JOHNSON.
Assignor to the JOHNSON ELECTRIC SERVICE COMPANY.
ELECTRIC VALVE.
No. 10,802. Reissued Jan. 25, 1887.
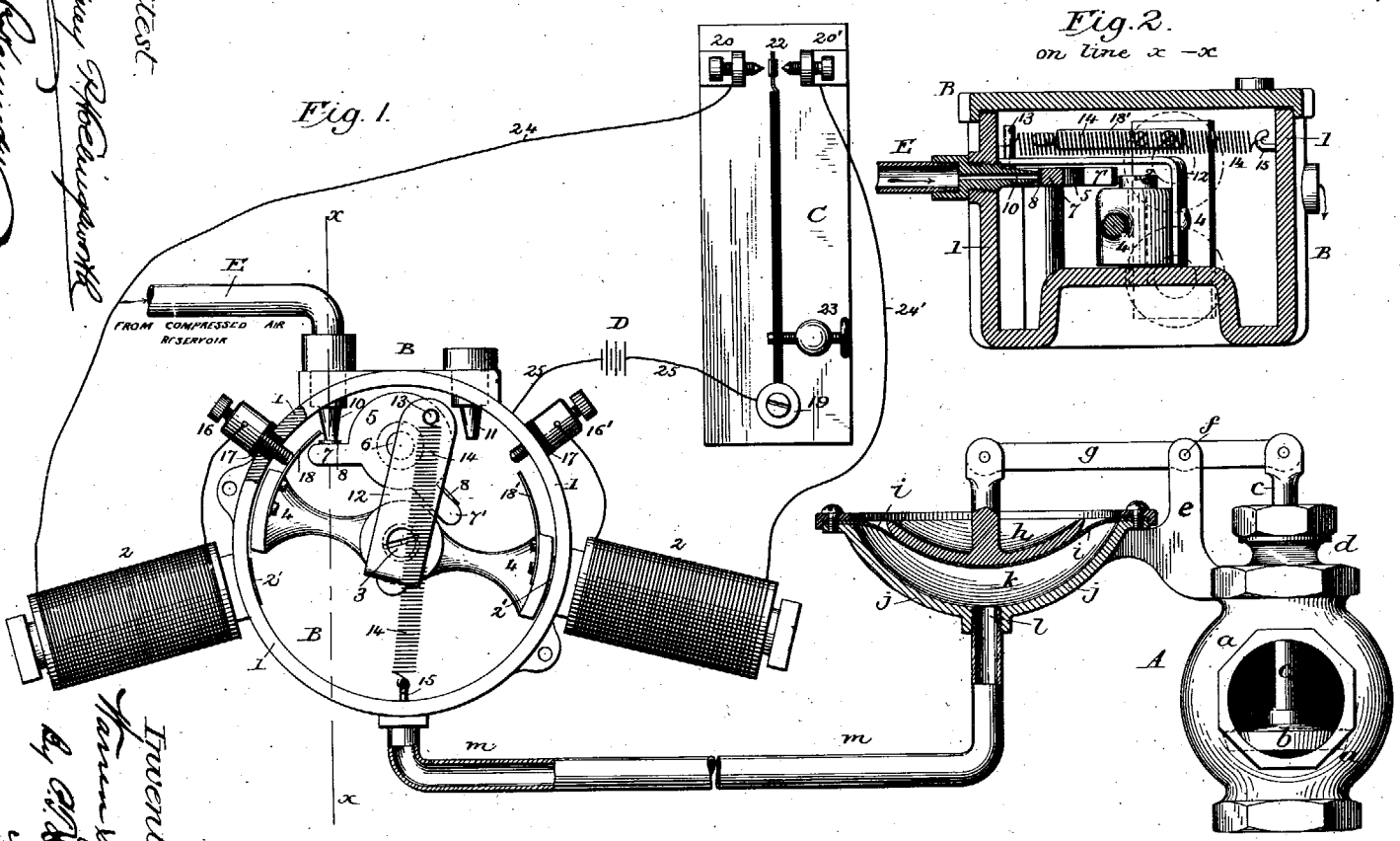
Attest.
Sidney R. Ellingwood
Jno. C. Kennedy.
Inventor.
Warren S. Johnson
By C. H. Dodge
Atty

UNITED STATES PATENT OFFICE.

WARREN S. JOHNSON, OF MILWAUKEE, WISCONSIN, ASSIGNOR TO THE JOHNSON ELECTRIC SERVICE COMPANY, OF SAME PLACE.

ELECTRIC VALVE.

SPECIFICATION forming part of Reissued Letters Patent No. 10,802, dated January 25, 1887.

Original No. 342,018, dated May 18, 1886. Application for reissue filed October 6, 1886. Serial No. 215,502.

*To all whom it may concern:*

Be it known that I, WARREN S. JOHNSON, of Milwaukee, in the county of Milwaukee, and in the State of Wisconsin, have invented certain new and useful Improvements in Electric Valves; and I do hereby declare that the following is a full, clear, and exact description thereof.

My invention relates to an improvement in apparatus designed to control valves—such as steam valves or dampers on furnaces, windows, transoms, ventilators, &c.—by means of a current of electricity. When temperatures are governed by such apparatus it is usually done automatically by a thermostat, which makes and breaks the electric circuit. Letters Patent for such improvements in such apparatus have already been granted to me, such patents being numbered 297,937 and 301,059.

My present invention consists of certain improvements in the previously-patented apparatus, which will be fully described hereinafter, and pointed out in the claims, the said improvements including the substitution for the closed-circuit battery shown in my previous patents of what is called an "open-circuit battery"—*i. e.*, one in which the current is used only momentarily, instead of for considerable periods of time, as in the ordinary closed-circuit battery. By my present invention the parts are so arranged that when a circuit is closed by some exciting cause external to the valve itself it is instantly broken by the mechanism of the valve, thus economizing in the greatest degree the electric energy. I am thus enabled to use a battery which requires less attention and one that is less liable to be come deranged when left without care for long periods of time.

In the drawings, Figure 1 is a combined plan and sectional view of my invention. Fig. 2 is a section on line *x x*, Fig. 1.

Referring to the drawings, A is the main valve; B, the electrically-actuated secondary valve which serves to control a fluid under pressure acting to operate the main valve A. C is a thermostat, which makes, at a remote point, the electric circuit which operates the valve B. The source of electricity is any convenient generator of electricity, preferably an open-circuit battery like the Leclanché, (indicated in the drawings at D.) A pipe, E, leads from some convenient reservoir of compressed air or other fluid under pressure, as water, steam, &c. The fluid under pressure is controlled by the valve B in such a manner that it in turn will operate the valve A, as will be shown.

In Fig. 1 the main valve A is composed of the valve-chamber *a*, the valve-disk *b*, whose stem *c* passes through the stuffing-box *d*, the support *e*, with the fulcrum *f*, the lever *g*, and cup *h*, which rests upon the flexible diaphragm *i*, of rubber or other suitable material, and the rigid cup-shaped backing *j*, which, with the diaphragm *i*, forms an air-tight chamber, *k*. This chamber *k* has a bottom orifice through which any fluid under pressure may enter the chamber *k*. It is evident that if any fluid under pressure, as air or steam, be admitted to the chamber *k*, it will force the cup *h* upward, carrying the long arm of the lever *g* with it, thereby forcing the short arm downward and closing valve-disk *b* to its seat. The pipe *m* leads to the secondary valve B, which serves to control the admission and release of the fluid under pressure to and from the chamber *k*. It is evident that any other form of chamber would do as well—for instance, a cylinder having a piston in place of the flexible diaphragm *i*.

In Fig. 1 of the drawings the cover of the valve-casing is removed to show the internal working parts. In practice the cover is screwed down, or in other ways made air-tight, thus inclosing the valve-chamber from the external air, although this particular arrangement is not essential to my device, as any other arrangement embodying the same functional arrangement of parts would do as well.

It will be perceived that the valve B, when adjusted in one position, allows the fluid to pass thereby to the conductor *m*, and that when turned in the opposite direction it prevents the further admission of fluid, and opening the outlet or waste-pipe 1 1 permits the fluid which had previously passed to retreat and escape through said waste-pipe after the manner of what are known in the art as "wastevalves;" and it is to be understood that it is to a valve of this character and to a valve which is moved by magnetic attraction that my invention is limited.

I do not claim herein an electrically-controlled valve the movement of which is effected by an engine or other power-driven motor.

2 2 are electro-magnets whose poles 2′ 2′ project through the valve-casing and appear upon the inside, so as to bring the field of magnetic force within the valve-casing, which avoids the unnecessary friction which might occur if any of the working parts passed through air-tight joints. The upper pole only of each magnet is shown in the drawings, the other pole and coil of each magnet being hidden by the one shown.

Pivoted at 3 (the center of the valve-casing) is the armature 4, which is common to the magnets 2 2, but so placed that while it is facing one of these magnets it is not in the direct field of the other magnet. By this arrangement, whenever either of the electro-magnets is excited it will draw the armature into its own field and out of the direct field of the opposing magnet, the circuit of the other magnet being open at some external point. By alternating the excitation of the magnets the armature 4 4 may be made to oscillate and perform the desired functions. Within the same valve-casing is the disk 5, pivoted at 6, and having the projecting arms 7 7′, which arms are faced with leather or other suitable substance, as shown at 8 8, for covering openings, as next described. Through the valve-casing there project the hollow cones 10 and 11, whose internal extremities form seats for the leathers 8 8 when they are brought before them by the movement of the disk 5. The cone 10 is the extremity of the pipe E, leading from the reservoir of compressed air or other suitable fluid, and the cone 11 simply communicates with the open air through the valve-casing 1, which is non-magnetic or of non-magnetic material, such as brass. The motion of the armature 4 4 is communicated to the disk 5 through the rigid lever 12, which is pivoted to pin 13 in the disk. As the armature stands in the drawings the orifice of the cone 10 is closed by the arm 7 of the disk 5. When the armature oscillates so as to face the opposing magnet, the disk 5 will be rotated sufficiently to close the orifice of the cone 11 by means of the arm 7′.

For the purpose of holding the arms 7 7′ close against the cones 10 11, so as to make them air-tight, also to hold the armature in its proper position while at rest, and to insure the breaking of the circuit by the circuit-breaker, the disk 5 is furnished with a spring, 14, fastened to the pin 13 at one extremity, and to the valve-casing or other support at 15. This spring, being at its fixed end fastened eccentrically to the center of the disk 5, tends to hold one of the arms, 7 or 7′, of the disk firmly against one of the cones 10 and 11, whichever it may be in contact with. Another important feature of this spring is its movement over a sensitive center—that is, in the movement from one side to the other it has a tendency to hold either of the ports closed and not to remain midway. The tension of the spring while at rest is always in favor of the last magnet excited, and does not tend to bring any of the operative parts into equilibrium. It is evident that an inverted pendulum or similar device would serve the same purpose.

In connection with the casing 1 of the secondary valve B are the binding-posts 16 16′, a prolongation of each post passing through the valve-casing so as to project into its interior. These posts are insulated from the valve-casing by means of the hard-rubber bushings shown at 17 17.

Attached to the armature 4 4, at either end, are the strips 18 18′, which in their journeyings alternately break the electrical contact with the posts 16 16′, and thus prevent the spark at the thermostat C. Such spark would soon spoil the delicate points and make the apparatus inoperative.

I do not deem it essential to minutely describe the thermostat C, which is of a well-known form, and whose operation depends on the differential expansion of two substances. In the thermostat shown 19 is the fixed end of the differential bar, and 22 the free end of said bar, having contact-plates. 23 is an adjusting-screw to set the thermostat at different temperatures. 20 20′ are opposing contact-posts, which serve with the differential bar to close separate electric circuits. From these points, respectively, there pass the wires 24 24′ to the magnets 2 2, and from the thermostatic bar there passes the wire 25 to the battery and then to the casing of valve B, which is metallic, although non-magnetic, as stated. As shown in the drawings, the valve A is open, since the valve-disk *b* is raised from its seat. The chamber *k* is not expanded, since there is a free egress for its contents through the opening *l* to the open orifice 11 in B. The arm 7 of the disk 5 in valve B closes the orifice 10 and prevents the escape of the fluid from the reservoir into the interior of the valve B. If, now, the thermostatic strip in C moves to the left and touches the point 20, a circuit will be formed through 25, 4, 18, 16, 2, and 24, the armature 4 4 will be attracted to the magnet in circuit, and the spring 14 will be thrown to the opposite side of the center 6 of the disk 5. At the same time the port 10 will be opened and the port 11 closed; also, the contact-strip 18 on the left of the armature 4 will have left the point of post 16, thus breaking the electric current. The breaking of the current at this point is a very important feature of my device, for the extra current produced by the breaking does not burn the delicate points of the thermostat. As the breaking is produced by the direct movement of the armature, it is always certain, and as the contacts are sliding they wear themselves bright. The strip 18′ on the right of the armature will have come into contact with the point of post 16′, so that the opposing magnet shall be in circuit whenever the button 22 shall touch post 20′ in C. As a result of this movement just traced, the interior of valve B and the expansible chamber *k* in A will be filled with the fluid under pressure. The expanding of chamber *k* will close the valve A, and it will remain closed until by a change of temperature the thermostat is thrown in circuit with the opposing magnet, when the disk 5, with arms 7 7′, will be partly revolved, so as to close port 10 and open 11, and the armature will again stand as shown in the drawings. The fluid under pressure is now free to escape and the valve A to open.

When this invention is attached to a heating apparatus, the movements of the thermostatic bar due to the variations of the temperature operate to control the electric currents which, acting through the magnets and armature, cause the latter to operate the secondary valve, which latter in turn controls the flow of the fluid which operates the main valve, and thus regulate the supply of heat. By the mutual reaction thus produced a uniform temperature may be kept.

Having thus fully described my invention, what I claim as new, and desire to secure by Letters Patent, is—

1. The combination of a main valve serving to govern a passage for steam, gas, air, or other substance, an expansion-chamber whose movable wall, through proper mechanism, operates said valve, an electrically-actuated valve serving to admit a fluid under pressure into said expansion-chamber and permit its subsequent escape therefrom, said electric valve consisting of opposing electro-magnets, a magnetically-moved armature, valve mechanism controlled by the armature, and suitable circuit-breaking devices for the circuits of the opposing magnets, also controlled by the armature, said circuit-breaking devices being independent of external closing devices, and said external circuit-closing devices, whereby a movement of the armature in one direction breaks the circuit of said magnet at a point distinct from its initial closing-point and places the opposing circuit in condition to be closed by the action of external closing devices, actuates the electric valve, and admits the fluid under pressure into said expansible chamber, and thus operates the main valve in one direction, and the closing of the opposing circuit by its external closing device allows the escape of the fluid under pressure from said expansion-chamber and operates the valve in the opposite direction, substantially as set forth.

2. In an electrically-actuated valve, the combination of opposing electro-magnets and magnetically-actuated armature, a valve controlled by the armature, and suitable contacts for the circuits of the opposing magnets, also controlled by the armature, but distinct and independent from external and primary closing devices, and the external closing devices, whereby the closing of one circuit at an external point causes a movement of the armature in one direction and breaks the circuit of said magnet at the magnetically-actuated circuit-breaker, while it is not broken at the initial point, and at the same time places the opposing circuit in condition to be closed by the action of external closing devices, substantially as set forth.

3. In an electrically-actuated valve, the combination of opposing electro-magnets and magnetically-moved armature, valve mechanism controlled by the armature, and suitable contacts for the circuits of the opposing magnets, also controlled by the armature, said contacts being independent of external closing devices, and a thermostat in circuit with the opposing magnets, whereby a movement of the armature in one direction by one of the electro-magnets operates the valve, breaks the circuit of said magnet at one point, and places the opposing circuit in condition to be closed by the thermostat, substantially as set forth.

4. The combination, in the casing of valve B, of a pivoted armature and a swinging disk, the latter having arms, as described, with a connecting-arm, 12, spring 14, and the inlet and outlet ports of the valve-casing, opposing electro-magnets and circuit-breakers, a thermostat, and suitable circuits controlled by said thermostat, whereby the said magnets are energized and the valve operated, as set forth.

5. The combination, in a temperature-regulator, of the valves A and B, and intermediate expansible chamber connected with the disk of valve A by a lever and with the interior of valve B by a pipe, and armature and opposing electro-magnets in circuit with a thermostat, inlet and outlet ports for compressed air, and a device operated by the armature for opening and closing the air-ports, as set forth.

6. In an electrically-actuated valve, the combination of opposing electro-magnets, opposing air-ports, mechanism actuated by said electro-magnets to alternately close one port while it opens the other, and a spring or its equivalent serving, when said electro-magnets are not excited, to hold one or the other of the ports closed and the armature before the magnet last excited, substantially as set forth.

7. The combination, with a main valve operated by fluid-pressure, of a secondary valve actuated by opposing electro-magnets, said secondary valve having opposing air-ports, and a spring or its equivalent attached to the valve mechanism, serving, when said electro-magnets are not excited, to hold one or the other of the ports tightly closed and the armature in the field of the magnet last excited, as set forth.

8. In an electrically-actuated valve, the combination, with opposing electro-magnets and their armature, valve mechanism, and circuit-breaking devices operated by said armature, of a spring or its equivalent moving over a sensitive center whenever either electro-magnet is energized, whereby the action of said spring tends to hold either one or the other port of the valve tightly closed, the armature before the magnet last energized, and the circuit of said magnet broken, substantially as set forth.

9. In an electrically-actuated valve, the combination, with the electro-magnets, the magnetically-moved armature, and the valve mechanism operated thereby, of sliding circuit-breaking strips, whereby a movement of the armature in either direction breaks the current which produced said motion and places the opposing circuit in position to be closed from an external source and at an external point, substantially as set forth.

10. The combination of a main valve operated by pressure, and a secondary electrically-actuated valve serving to operate the main valve by fluid-pressure, said secondary valve consisting of electro-magnets, a magnetically-moved armature, valve mechanism, and circuit-breakers, whereby the closing of the circuit at a remote point operates the secondary and main valves and breaks the circuit at the circuit-breaker within the valve itself, substantially as set forth.

11. In an electrically-actuated valve for controlling fluids, the combination, with the valve proper, of electro-magnetic actuating mechanism, electric circuits controlled by external circuit-closing devices, and circuit-breaking devices, also controlled by said electro-magnetic mechanism, whereby the closing of one circuit by its external circuit-closing device serves to operate the valve in one direction, breaks said circuit at one circuit-breaking point, while it remains closed at the external closing device, and places the other circuit in condition to be closed by the action of its external closing device, and whereby the closing of said other circuit by its external closing device serves to operate the valve in the other direction, breaks said circuit at the other circuit-breaking device, and places the opposing circuit in condition to be closed by the action of its external closing device, substantially as set forth.

12. The combination, with a main valve actuated by fluid-pressure, of an electrically-actuated secondary valve, said secondary valve consisting of electro-magnetic actuating mechanism, and circuit-breaking devices, also actuated by the magnetic force, whereby the closing of the electric circuit from some external source operates the secondary valve, and by its means the main valve at the same time breaks said circuit at a point distinct from its initial closing-point and leaves the armature at the opposite point of its prescribed movement, substantially as set forth.

WARREN S. JOHNSON.

Witnesses:
ALFRED MORAWETZ,
ROBERT R. HOSKING.